United States Patent
Wang et al.

(10) Patent No.: US 8,548,375 B2
(45) Date of Patent: *Oct. 1, 2013

(54) GAIN CONTROL METRIC COMPUTATION IN A WIRELESS REPEATER

(75) Inventors: Michael Mao Wang, San Diego, CA (US); Dhananjay Ashok Gore, San Diego, CA (US); Gwendolyn Denise Barriac, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

This patent is subject to a terminal disclaimer.

(21) Appl. No.: 12/722,694

(22) Filed: Mar. 12, 2010

(65) Prior Publication Data

US 2011/0223853 A1    Sep. 15, 2011

(51) Int. Cl.
*H04B 7/14*    (2006.01)

(52) U.S. Cl.
USPC ............. 455/7; 455/9; 455/11.1; 455/24; 455/13.4; 455/177.1; 370/315; 370/318

(58) Field of Classification Search
USPC .............. 455/7, 9, 24, 11.1, 69, 522, 464, 455/10, 13.1, 13.4, 16, 513, 67.16, 67.13, 455/67.11, 63.1, 570, 571, 115.1, 115.3, 455/135, 136, 138, 213, 177.1; 370/335, 370/342, 252, 241, 315, 318; 375/142, 211, 375/213, 267
See application file for complete search history.

(56) References Cited

U.S. PATENT DOCUMENTS

| | | | |
|---|---|---|---|
| 5,115,514 A | 5/1992 | Leslie | |
| 5,930,293 A | 7/1999 | Light et al. | |
| 6,269,165 B1 | 7/2001 | Stott et al. | |
| 7,386,305 B2 | 6/2008 | Etkin et al. | |
| 7,406,295 B1 | 7/2008 | Yarkosky | |
| 7,424,270 B2 | 9/2008 | Gaal | |
| 7,480,486 B1 | 1/2009 | Oh et al. | |
| 7,577,398 B2 | 8/2009 | Judd et al. | |
| 7,974,573 B2 | 7/2011 | Dean | |
| 8,010,042 B2 | 8/2011 | Judd et al. | |
| 2002/0044667 A1 | 4/2002 | Stott et al. | |
| 2002/0045431 A1 | 4/2002 | Bongfeldt | |
| 2003/0022626 A1* | 1/2003 | Miquel et al. | 455/24 |
| 2004/0110469 A1 | 6/2004 | Judd et al. | |
| 2004/0166802 A1 | 8/2004 | McKay, Sr. et al. | |
| 2005/0058104 A1* | 3/2005 | Yomo et al. | 370/335 |

(Continued)

FOREIGN PATENT DOCUMENTS

EP    0772310 A2    5/1997
EP    1748578       1/2007

(Continued)

OTHER PUBLICATIONS

International Search Report and Written Opinion—PCT/US2011/028210, ISA/EPO—Jul. 6, 2011.

*Primary Examiner* — Tan Trinh
(74) *Attorney, Agent, or Firm* — Thien T. Nguyen

(57) ABSTRACT

A wireless repeater includes a gain control metric computation block to compute a gain control metric for use in controlling the variable gain of the repeater. The gain control metric is computed by downsampling the gain control input signal to the gain control metric computation block and also downsampling the computed correlation and normalization terms. The gain control metric may be further enhanced by filtering the computed metric values using linear or non-linear filtering.

25 Claims, 6 Drawing Sheets

(56) References Cited

U.S. PATENT DOCUMENTS

| | | |
|---|---|---|
| 2005/0176368 A1 | 8/2005 | Young et al. |
| 2005/0227619 A1 | 10/2005 | Lee et al. |
| 2006/0003697 A1 | 1/2006 | Asai et al. |
| 2006/0019603 A1 | 1/2006 | Pergal |
| 2006/0040611 A1 | 2/2006 | Ding et al. |
| 2006/0172781 A1* | 8/2006 | Mohebbi ............... 455/571 |
| 2006/0205343 A1 | 9/2006 | Runyon et al. |
| 2006/0251156 A1* | 11/2006 | Grant et al. ............... 375/148 |
| 2007/0147329 A1 | 6/2007 | Soriaga et al. |
| 2007/0155314 A1* | 7/2007 | Mohebbi ............... 455/11.1 |
| 2007/0249283 A1 | 10/2007 | Braithwaite |
| 2008/0113617 A1* | 5/2008 | Braithwaite ............... 455/7 |
| 2008/0176513 A1 | 7/2008 | Braithwaite et al. |
| 2008/0205661 A1 | 8/2008 | Kim et al. |
| 2008/0261519 A1 | 10/2008 | DeMarco et al. |
| 2008/0293360 A1 | 11/2008 | Maslennikov et al. |
| 2009/0201153 A1 | 8/2009 | Browning, Jr. et al. |
| 2009/0201421 A1* | 8/2009 | Mawatari et al. ............. 348/553 |
| 2009/0207776 A1 | 8/2009 | Baik et al. |
| 2010/0009625 A1 | 1/2010 | Chami et al. |
| 2010/0073227 A1 | 3/2010 | Waters et al. |
| 2010/0285733 A1 | 11/2010 | Gore et al. |
| 2010/0285734 A1 | 11/2010 | Black et al. |
| 2010/0285735 A1 | 11/2010 | Gore et al. |
| 2010/0285736 A1 | 11/2010 | Gore et al. |
| 2010/0285737 A1 | 11/2010 | Gore et al. |
| 2010/0285739 A1* | 11/2010 | Wang et al. ............... 455/9 |
| 2010/0285740 A1 | 11/2010 | Wang et al. |
| 2010/0285741 A1 | 11/2010 | Wang et al. |
| 2010/0285742 A1 | 11/2010 | Wang et al. |
| 2010/0285744 A1* | 11/2010 | Wang et al. ............... 455/24 |
| 2010/0316092 A1 | 12/2010 | Hannan et al. |
| 2011/0117834 A1 | 5/2011 | Martin |

FOREIGN PATENT DOCUMENTS

| | | |
|---|---|---|
| EP | 1931063 A2 | 6/2008 |
| WO | WO2008109570 A2 | 9/2008 |
| WO | WO2008109571 A2 | 9/2008 |
| WO | WO2009020326 A1 | 2/2009 |
| WO | WO2010132473 A2 | 11/2010 |

\* cited by examiner

GAIN CONTROL METRIC COMPUTATION IN A WIRELESS REPEATER

CROSS-REFERENCE TO RELATED APPLICATIONS

This application is related to copending and commonly assigned U.S. patent application Ser. No. 12/722,733, entitled "Gain Control Metric Computation In A Wireless Repeater," filed on Mar. 12, 2010, having at least one common inventor thereof, which application is incorporated herein by reference in its entirety.

BACKGROUND

1. Field

This disclosure generally relates to repeaters in wireless communication systems.

2. Background

Wireless communication systems and techniques have become an important part of the way we communicate. However, providing coverage can be a significant challenge to wireless service providers. One way to extend coverage is to deploy repeaters.

In general, a repeater is a device that receives a signal, amplifies the signal, and transmits the amplified signal. FIG. 1 shows a basic diagram of a repeater 110, in the context of a cellular telephone system. Repeater 110 includes a donor antenna 115 as an example network interface to network infrastructure such as a base station 125. Repeater 110 also includes a server antenna 120 (also referred to as a "coverage antenna") as a mobile interface to mobile device 130. In operation, donor antenna 115 is in communication with base station 125, while server antenna 120 is in communication with mobile devices 130.

In repeater 110, signals from base station 125 are amplified using forward link circuitry 135, while signals from mobile device 130 are amplified using reverse link circuitry 140. Many configurations may be used for forward link circuitry 135 and reverse link circuitry 140.

There are many types of repeaters. In some repeaters, both the network and mobile interfaces are wireless; while in others, a wired network interface is used. Some repeaters receive signals with a first carrier frequency and transmit amplified signals with a second different carrier frequency, while others receive and transmit signals using the same carrier frequency. For "same frequency" repeaters, one particular challenge is managing the feedback that occurs since some of the transmitted signal can leak back to the receive circuitry and be amplified and transmitted again. Existing repeaters manage feedback using a number of techniques; for example, the repeater is configured to provide physical isolation between the two antennae, filters are used, or other techniques may be employed.

SUMMARY

Systems, apparatuses, and methods disclosed herein allow for enhanced repeater capability. In one embodiment, a method for computing a gain control metric for a wireless repeater in a wireless communication system is described. The wireless repeater has a first antenna and a second antenna to receive a receive signal and transmit an amplified signal where the receive signal is a sum of a remote signal to be repeated and a feedback signal resulting from a feedback channel between the first and second antenna of the wireless repeater, the feedback channel thus forming a feedback loop between the first and second antennas. The method includes receiving a gain control input signal from a receive circuitry of the repeater where the gain control input signal is taken from any point in the feedback loop of the repeater, downsampling the gain control input signal at a first downsampling rate, computing a correlation term for each of desired channel taps where the correlation term is indicative of a correlation of the gain control input signal and a delayed version of the gain control input signal, computing a normalization term where the normalization term is indicative of a power of the gain control input signal that is not delayed, downsampling the computed correlation terms and the normalization term at a second downsampling rate, computing a pre-filtered gain control metric using a given function of at least the downsampled correlation terms, and filtering the pre-filtered gain control metric to generate the gain control metric.

According to another aspect of the present invention, a wireless repeater has a first antenna and a second antenna to receive a receive signal and transmit an amplified signal where the receive signal is a sum of a remote signal to be repeated and a feedback signal resulting from a feedback channel between the first antenna and the second antenna. The feedback channel forms a feedback loop between the first and second antennas. The wireless repeater includes a receive circuitry configured to receive the receive signal from one of the first antenna and the second antenna. The receive circuitry is further configured to provide a gain control input signal, the gain control input signal being taken from any point in the feedback loop of the repeater. The wireless repeater further includes a gain metric generator coupled to receive the gain control input signal from the receive circuitry of the repeater. The gain metric generator is configured to downsample the gain control input signal at a first downsampling rate, to compute a correlation term for each of desired channel taps where the correlation term is indicative of a correlation of the gain control input signal and a delayed version of the gain control input signal, to compute a normalization term where the normalization term is indicative of a power of the gain control input signal that is not delayed, to downsample the computed correlation terms and the normalization term at a second downsampling rate, to compute a pre-filtered gain control metric using a given function of at least the downsampled correlation terms, and to filter the pre-filtered gain control metric to generate the gain control metric.

DETAILED DESCRIPTION

The nature, objectives, and advantages of the disclosed method and apparatus will become more apparent to those skilled in the art after considering the following detailed description in connection with the accompanying drawings.

Prior art repeaters such as those described above may provide significant advantages for cellular telephone or similar networks. However, existing repeater configurations may not be suitable for some applications. For example, existing repeater configurations may not be suitable for indoor coverage applications (e.g., repeating signals for a residence or business environment) where the antennas may be placed closer together and therefore have less "spatial" isolation. Moreover, in some traditional repeater implementations, the target is to achieve as high a gain as reasonable while maintaining a stable feedback loop (loop gain less than unity). However, increasing the repeater gain renders isolation more difficult due to the increased signal leaking back into the donor antenna. In general, loop stability demands require that the signal leaking back into the donor antenna from the coverage antenna be much lower than the remote signal (the signal to be repeated). The requirement for high repeater gain leads to increased isolation requirements. However, for some indoor applications, the proximity of the antennas decreases the "spatial" isolation. Hence, other kinds of isolation must be developed to maintain system stability.

In some applications, a repeater employs interference cancellation or echo cancellation to significantly improve the isolation between the repeaters' donor antenna ("the receiving antenna" for the example of a forward link transmission) and the coverage antenna ("the transmitting antenna" for forward link transmissions). Effective echo cancellation requires very accurate channel estimation of the leakage channel. In general, the more accurate the channel estimate, the higher the cancellation and hence the higher the effective isolation. Herein, "interference cancellation" or "echo cancellation" refers to techniques that reduce or eliminate the amount of leakage signal between repeater antennas; that is, "interference cancellation" refers to cancellation of an estimated leakage signal, which provides for partial or complete cancellation of the actual leakage signal.

Systems and techniques herein provide for repeaters with improved gain control for enhancing the stability of the repeater system. In some embodiments, a gain control metric is optimized for use in controlling the gain of the repeater. The gain control metric computation methods and systems according to embodiments of the present invention can be advantageously applied to repeaters employing interference cancellation or repeaters not employing interference cancellation.

Figure 1:
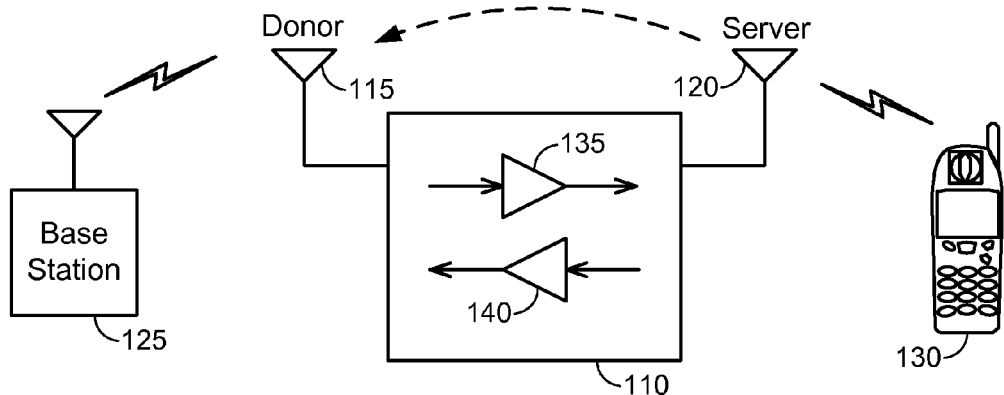
FIG. 1 is a simplified diagram of a repeater according to the prior art.
Figure 2:
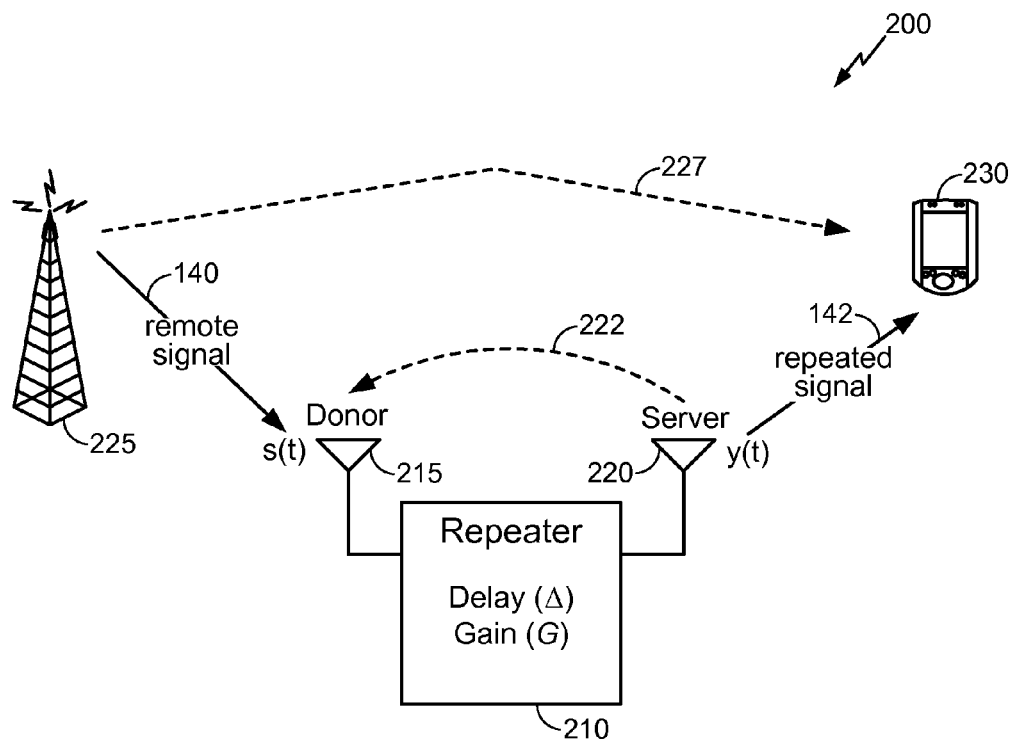
FIG. 2 shows a diagram of a repeater environment according to some embodiments of the current disclosure.

FIG. 2 shows a diagram of an operating environment 200 for a repeater 210 according to embodiments of the current disclosure. The example of FIG. 2 illustrates forward link transmissions; i.e., a remote signal 140 from a base station 225 is intended for a mobile device 230. A repeater, such as repeater 210, may be used in environment 200 if an unrepeated signal along the path 227 between base station 225 and mobile device 230 would not provide sufficient signal for effective voice and/or data communications received at mobile device 230. Repeater 210 with a gain G and a delay Δ is configured to repeat a signal received from base station 225 on a donor antenna 215 to mobile device 230 using a server antenna 220. Repeater 210 includes forward link circuitry for amplifying and transmitting signals received from the base station 225 to mobile device 230 through donor antenna 215 and server antenna 220. Repeater 210 may also include reverse link circuitry for amplifying and transmitting signals from mobile device 230 back to base station 225. At repeater 210, the remote signal s(t) is received and the remote signal s(t) is repeated as a repeated or amplified signal y(t) where $y(t)=\sqrt{G}s(t-\Delta)$. Ideally, the gain G would be large, the inherent delay Δ of the repeater would be small, the input SINR would be maintained at the output of repeater 210 (this can be of particular importance for data traffic support), and only desired carriers would be amplified.

In practice, the gain of repeater 210 is limited by the isolation between donor antenna 215 and server antenna 220. If the gain is too large, the repeater can become unstable due to signal leakage. Signal leakage refers to the phenomenon where a portion of the signal that is transmitted from one antenna (in FIG. 2, server antenna 220) is received by the other antenna (in FIG. 2, donor antenna 215), as shown by the feedback path 222 in FIG. 2. Without interference cancellation or other techniques, the repeater would amplify this feedback signal, also referred to as the leakage signal, as part of its normal operation, and the amplified feedback signal would again be transmitted by server antenna 220. The repeated transmission of the amplified feedback signal due to signal leakage and high repeater gain can lead to repeater instability. Additionally, signal processing in repeater 210 has an inherent non-negligible delay Δ. The output SINR of the repeater is dependent on RF non-linearities and other signal processing. Thus, the aforementioned ideal repeater operational characteristics are often not attained. Finally, in practice, the desired carriers can vary depending on the operating environment or market in which the repeater is deployed. It is not always possible to provide a repeater that amplifies only the desired carriers.

The communication system in which the repeater of the present invention can be deployed includes various wireless communication networks based on infrared, radio, and/or microwave technology. Such networks can include, for example, a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The systems and techniques described herein may also be used for any combination of WWAN, WLAN and/or WPAN.

In traditional repeater implementations, the target is to achieve as high a gain as possible while ensuring that the feedback loop remains stable (loop gain less than unity). High gain level provides maximum possible coverage area. Loop stability demands require that the signal leaking back into the donor antenna from the coverage antenna is typically much lower than the remote signal (the signal to be repeated). The maximum achievable SINR at the output of the repeater is then the same as the SINR at the input to the repeater. The repeater gain may be increased significantly through the use of interference cancellation techniques. With these techniques, the signal leaking back from the coverage antenna into the donor antenna is treated as interference and cancelled through baseband techniques, thereby allowing a higher repeater gain to be used. Any uncancelled leakage of the transmitted signal in the receive signal acts as noise added to the original remote signal and limits the output SNR. Higher repeater gain is very desirable since it increases the coverage area of the repeater. However, repeater stability must be unconditionally maintained.

To keep repeater operation stable, control of the loop gain of the repeater is critical. According to embodiments of the present invention, a repeater includes a gain control block employing a gain control metric generator that estimates the system loop gain and implementing a gain control method to control the variable gain of the repeater based on the gain control metric. The gain control metric is optimized for estimation accuracy and complexity through downsampling of the input to the gain control metric generator and linear or nonlinear filtering at the output of the gain control metric generator to improve the metric performance, as measured by low estimation bias and variance. According to some embodiments of the present invention, the gain control metric, being an indicator of system stability, is monitored continuously and the gain of the repeater is adjusted up and down to output as high a gain as possible while at the same time system stability and required output SINR are maintained by maintaining the gain control metric to a corresponding level (e.g., −18 dB). The repeater gain control metric computation methods and systems described herein can be adapted for use in a repeater with echo cancellation or a repeater without echo cancellation.

Figure 3:
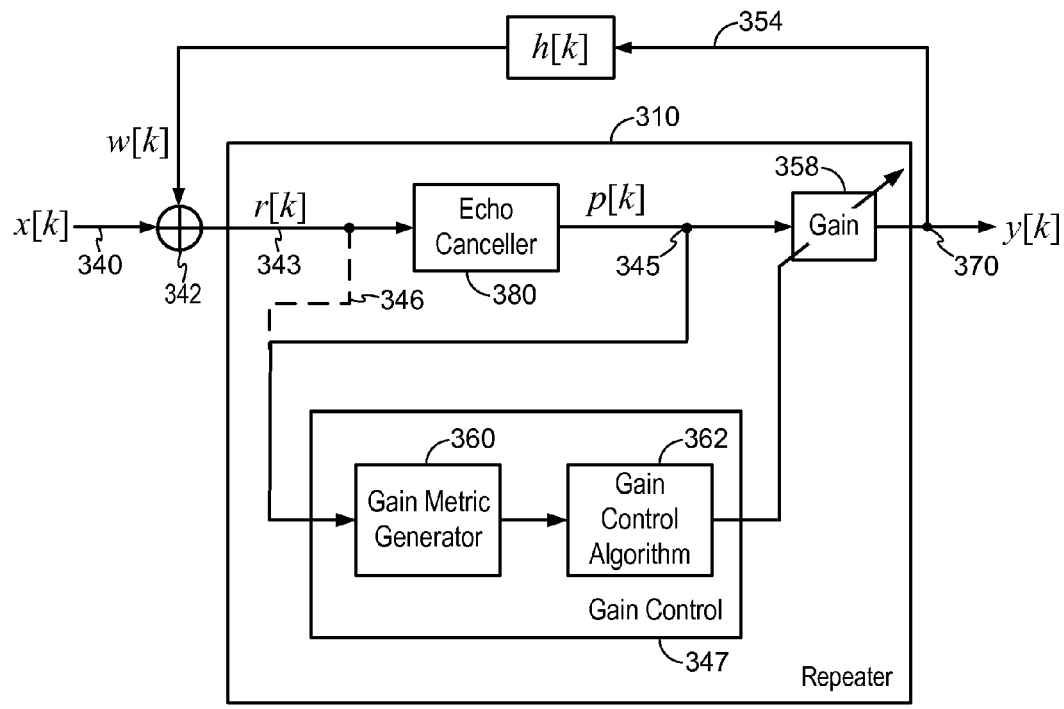
FIG. 3 is a block diagram of a repeater employing echo cancellation illustrating the repeater gain control method according to one embodiment of the present invention.

FIG. 3 is a block diagram of a repeater employing echo cancellation illustrating the repeater gain control method according to one embodiment of the present invention. Referring to FIG. 3, an echo-cancellation repeater 310 receives a remote signal x[k] to be repeated on a donor antenna (denoted as input node 340) and generates an output signal y[k] to be transmitted on a server antenna (denoted as output node 370). Signal leakage from the server antenna back to the donor antenna causes part of the output signal y[k] to be leaked back and added to the remote signal before being received by the repeater. The signal leakage is represented as a feedback channel h[k], denoted as a signal path 354 between output node 370 and the input node 340. Thus, repeater 310 actually receives as an input on a node 343 a receive signal r[k] being the sum of the remote signal x[k] and the feedback signal w[k]. The feedback channel h[k] thus form a feedback loop in repeater 310 between the donor antenna and the server antenna. A summer 342 in FIG. 3 is symbolic only to illustrate the signal components of receive signals r[k] and does not represent an actual signal summer in the operating environment of repeater 310.

Repeater 310, being an echo-cancellation repeater, operates to estimate the feedback signal w[k] in order to cancel out the undesired feedback signal component in the receive signal. To that end, repeater 310 includes an echo canceller 380 which includes, among other things, a summer and a channel estimation block (not shown). The receive signal r[k] is coupled to the summer in the echo canceller 380 which operates to subtract a feedback signal estimate ŵ[k] from the receive signal r[k]. As long as the feedback signal estimate ŵ[k] is accurate, the undesired feedback signal is removed from the receive signal and echo cancellation is realized. In the present embodiment, the post cancellation signal p[k] (node 345) is coupled to a variable gain stage 358 providing a gain of G to the post cancellation signal. Gain stage 358 generates the output signal y[k] on the output node 370 for transmission on the server antenna. FIG. 3 illustrates only elements that are relevant to operation of the gain control method of the present invention. Repeater 310 may include other elements not shown in FIG. 3 but known in the art to realize the complete repeater operation. Furthermore, FIG. 3 illustrates one method for implementing echo cancellation. FIG. 3 is intended to be illustrative only and is not intended to be limiting. In other embodiments, other methods for implementing echo cancellation can be used.

Repeater 310 incorporates a gain control block 347 for adjusting the variable gain value G provided by gain stage 358. Gain control block 347 includes a gain metric generator 360 for generating and monitoring a gain control metric. Gain control block 347 further includes a gain control algorithm block 362 receiving the gain control metric from the gain metric generator 360. The gain control algorithm block 362 provides control of the variable gain G of the gain stage 358 in repeater 310. In the present embodiment, gain metric generator 360 of repeater 310 operates on the echo-cancelled receive signal p[k] for generating the gain control metric. In other embodiments, the gain metric generator can operate on the receive signal r[k] before echo cancellation, as shown by the dotted line 346 in FIG. 3, or even on the output signal y[k] after the gain stage.

Figure 4:
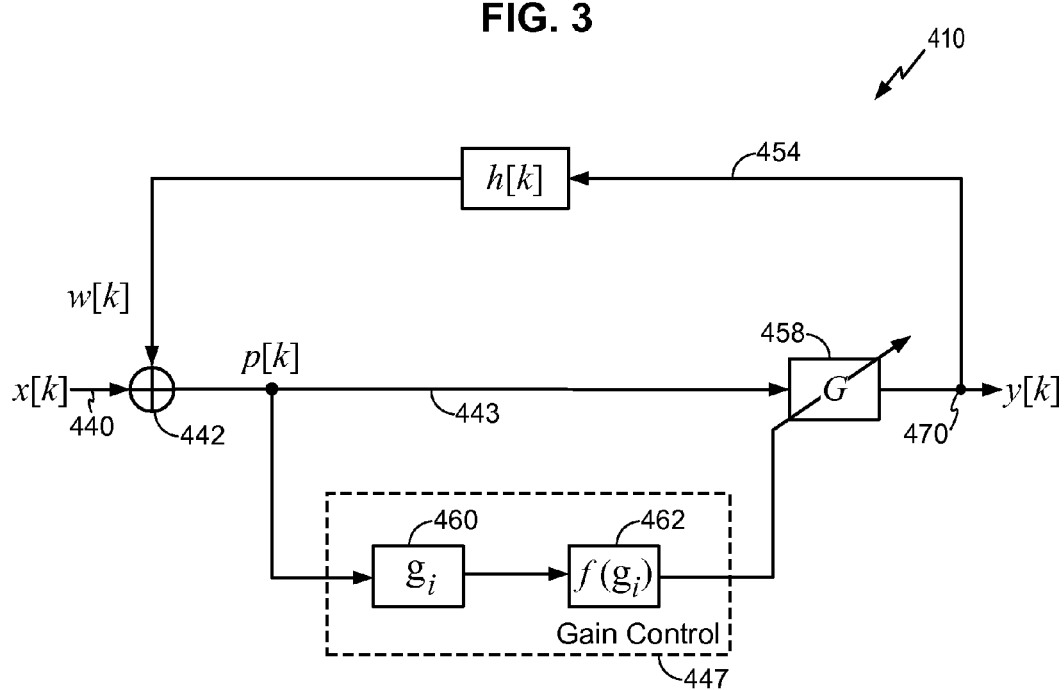
FIG. 4 is a block diagram of a repeater without echo cancellation and implementing the gain control method according to one embodiment of the present invention.

FIG. 4 is a block diagram of a repeater without echo cancellation and implementing the gain control method according to one embodiment of the present invention. Referring to FIG. 4, a repeater 410 receives a remote signal x[k] to be repeated on a donor antenna (denoted as input node 440) and generates an output signal y[k] to be transmitted on a server antenna (denoted as output node 470). Signal leakage from the server antenna back to the donor antenna causes part of the output signal y[k] to be leaked back and added to the remote signal before being received by the repeater. The signal leakage is represented as a feedback channel h[k], denoted as a signal path 454 between output node 470 and the input node 440. Thus, repeater 410 actually receives as an input on a node 443 a receive signal p[k] being the sum of the remote signal x[k] and the feedback signal w[k]. The feedback channel h[k] thus form a feedback loop in repeater 410 between the donor antenna and the server antenna. A summer 442 in FIG. 4 is symbolic only to illustrate the signal components of receive signals p[k] and does not represent an actual signal summer in the operating environment of repeater 410. The receive signal p[k] is coupled to a variable gain stage 458 providing a gain of G. Gain stage 458 generates the output signal y[k] on the output node 470 for transmission on the server antenna. FIG. 4 illustrates only elements that are relevant to operation of the gain control method of the present invention. Repeater 410 may include other elements not shown in FIG. 4 but known in the art to realize the complete repeater operation.

Repeater 410 incorporates a gain control block 447 for adjusting the variable gain value G provided by gain stage 458. Gain control block 447 includes a gain metric generator 460 for generating and monitoring a gain control metric. Gain control block 447 further includes a gain control algorithm block 462 receiving the gain control metric from the gain metric generator 460. The gain control algorithm block 462 provides control of the variable gain G of the gain stage 458 in repeater 410.

As described with reference to FIG. 3 and FIG. 4, the gain control metric computation method and system of the present invention can be applied in a repeater that implements echo cancellation or that does not implement echo cancellation. Furthermore, the gain control metric computation method and system can operate on a signal in the feedback loop of the repeater before or after echo-cancellation, or before or after the variable gain stage. To that end, the gain control metric computation method and system of the present invention operates on a gain control input signal which can be taken from any point in the repeater circuitry. In the present description, the repeater circuitry of the repeater refers in general to circuitry in the repeater which may or may not include echo-cancellation operations and may or may not include the variable gain stage. The gain control metric thus computed is applied to adjust the gain applied to amplify the receive signal of the repeater where the receive signal can be an echo cancelled signal or a non-echo cancelled signal. More specifically, the gain control block in repeater 310 or 410 receives a gain control input signal which can be taken from anywhere in the feedback loop of the repeater. More specifically, the gain control input signal can be taken before echo cancellation or after echo cancellation in an echo cancelling repeater. In the present embodiment, the gain control input signal is taken as the post-cancellation signal p[k] but this is illustrative only. In practice, the exact location of where the gain control input signal is taken is not critical to the practice of the present invention. For repeater 410 which does not implement echo cancellation, the gain control block 447 receives a gain control input signal which can be a signal anywhere in the feedback loop of the repeater. Again, the exact location of where the gain control input signal is taken is not critical to the practice of the present invention.

The derivation of the gain control metric is now described with reference to FIGS. 3 and 4. First, a complex signal segment of length N at i from the repeater control loop (at node 345 or node 443) is intercepted and used as the gain control input signal:

$$r_i[n] = \frac{q[n+i]}{\sqrt{\sum_{i=0}^{N-1}|q[n+i]|^2}}, \quad 0 \leq n < N.$$

The gain metric generator 360/460 monitors the growth of this signal component in the loop by trying to pick up replicas of the signal, as a result of the leakage from the transmit antenna to the receive antenna. Searching in a search window W after time $N_{delay}$ at $\tau \in W \equiv \{0, 1, L, N_{tap}-1\}$ gives $$g_i(\tau) = \frac{\left|\sum_{n=0}^{N-1} r^*[n]p[n+i+N_{delay}+\tau]\right|^2}{\sum_{n=0}^{N-1}|p[n+i]|^2} = \left(\frac{\left|\sum_{n=0}^{N-1} p^*[n+i]p[n+i+N_{delay}+\tau]\right|^2}{\sum_{n=0}^{N-1}|p[n+i]|^2}\right).$$

The metric $g_i(\tau)$ given above is essentially the loop gain which is an indicator of system stability. The loop gain metric $g_i(\tau)$ given above computes the loop gain for each channel tap $\tau$ and is referred hereinafter as the "tap-specific gain control metric." The tap-specific gain control metric $g_i(\tau)$, when summed over all channel taps, can be used for adjusting the gain $G_i$ of the variable gain stage 358/458 in a way so as to ensure loop stability:

$$g_i = \sum_{\tau \in \{0,1,L,N_{tap}-1\}} \alpha(\tau)g_i(\tau) \approx \delta < 1.$$

That is, the tap-specific gain control metric $g_i(\tau)$ is measured and summed over all of the desired channel taps and the summed value is the gain control metric $g_i$ for the repeater which is maintained to be about the value $\delta$ which is less than 1. Typically, $\delta$ is determined by the output SINR requirement. In one embodiment, $\delta$ is selected to be −10 dB to −20 dB in accordance with the required output SINR. Also, for typical repeater operation, the total loop gain has to be less than 1 (0 dB) for stability. In one embodiment, $\delta$ is selected to be −20 dB when the required output SINR is in the range of 20 dB. In the above equation, the gain control metric $g_i$ is computed as a linear combination of the tap-specific gain control metric $g_i(\tau)$ over all channel taps, each tap-specific gain control metric $g_i(\tau)$ being multiplied by its own coefficient $\alpha(\tau)$, which can be 1 for a straight summation of the tap-specific gain control metric terms or other values for other forms of linear combination. In other embodiments, the gain control metric $g_i$ can be computed as a non-linear combination of the tap-specific gain control metric $g_i(\tau)$ over all of the desired channel taps.

As shown in the equation above, the tap-specific gain control metric $g_i(\tau)$ can be characterized as a square of a correlation term $R_i$ in the numerator divided by a normalization term $S_i$ in the denominator, where $\tau$ is the channel taps in time domain associated with the spread of the feedback signal in time domain, such as due to multipath effect. More specifically, $$g_i(\tau) = \left|\frac{\sum_{n=0}^{N-1} p^*[n+i]p[n+i+N_{delay}+\tau]}{\sum_{n=0}^{N-1}|p[n+i]|^2}\right|^2 = \left|\frac{R_i(\tau)}{S_i}\right|^2,$$

$$\tau = 0, 1, L, N_{tap}.$$

More specifically, the correlation term represents a correlation of the gain control input signal and a delayed version of the gain control input signal while the normalization term represents the power of the gain control input signal that is not delayed. The correlation term and the normalization term are each computed for an integration length of N, that is, for N samples.

The gain control metric $g_i$ is the sum of the tap-specific gain control metric over all the feedback channel taps, given as:

$$g_i = \sum_{\tau=1}^{N_{tap}} g_i(\tau) = \frac{\sum_{\tau=1}^{N_{tap}}|R_i(\tau)|^2}{S_i^2}.$$

However, the calculation of the gain control metric $g_i$ is computationally intensive. For instance, for computing the correlation term $R_i$, a large number of multiplications is required to find the correlation value. More specifically, for an integration length of N, each time the correlation term needs to be updated, N complex multiplications have to be carried out; and each time the normalization term needs to be updated, another N complex multiplications have to be carried out. For large integration length N, the computational complexity can be prohibitive in practice.

According to embodiments of the present invention, a gain control metric computation method and apparatus enables efficient implementation of the above-described gain control metric. The gain control metric is optimized by downsampling the gain control input signal to the gain metric generator and by downsampling the computed correlation and normalization terms. Furthermore, the gain control metric thus computed is subject to filtering to remove gain control metric noise. In one embodiment, non-linear filtering using a median filter is used to filter the gain control metric. In other embodiments, linear filtering can be used to filter the gain control metric.

The gain control metric computation method and apparatus provides many advantages over conventional gain control methods. In a repeater environment, samples of the gain control input signal to the gain metric generator are typically highly correlated. By downsampling the gain control input signal and the correlation/normalization computations, the downsampling operations significantly reduce the computational burden. The downsampling operations also reduce any undesired bias in the metric calculation. Thus, the need for bias removal circuitry is eliminated and the implementation of the repeater is simplified. Furthermore, in some cases, the gain metric noise is not symmetric, the use of a non-linear filter (such as IIR or FIR filter) can be beneficial in removing outliers in the computed metric values.

Figure 5:
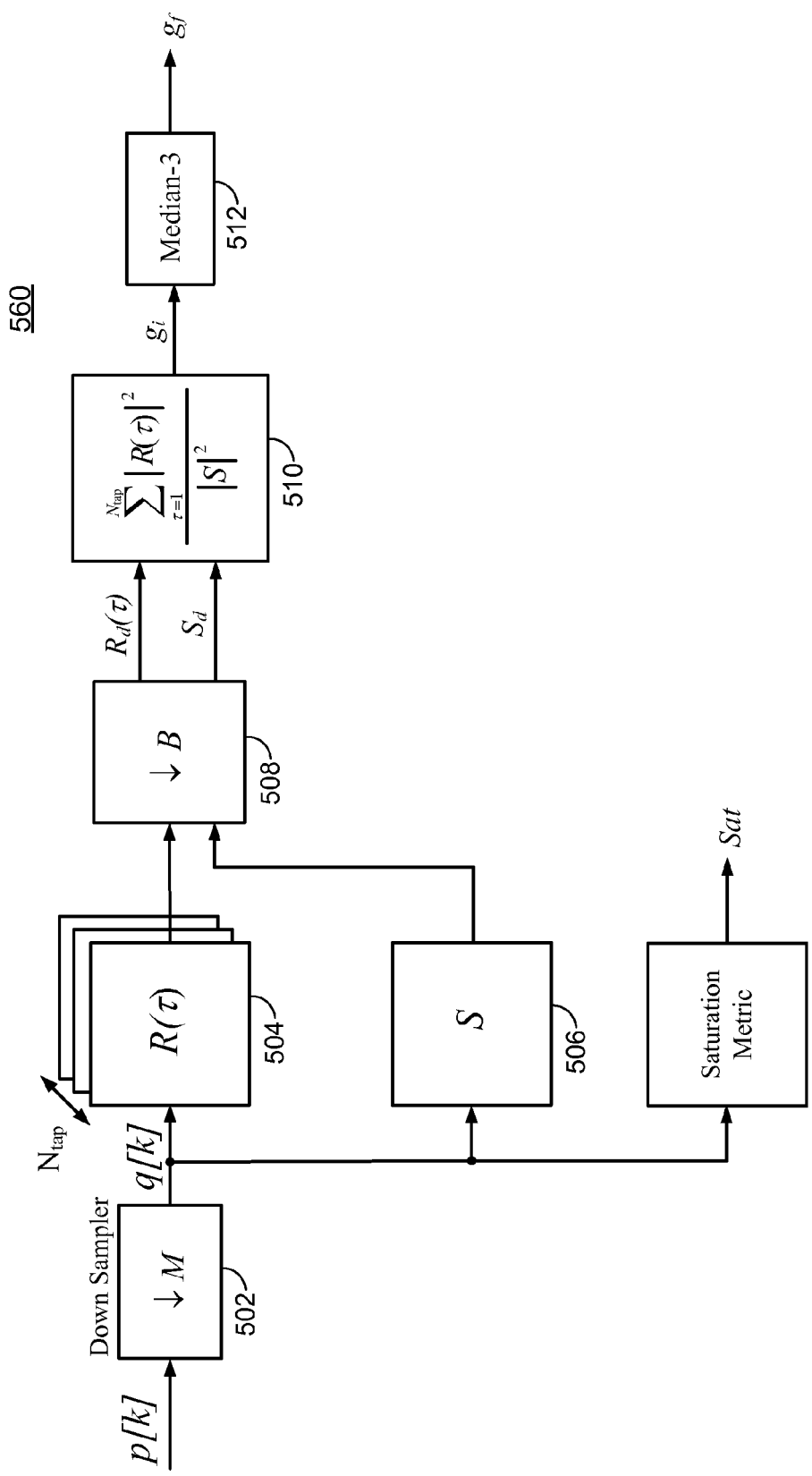
FIG. 5 is a block diagram of a gain metric generator which can be incorporated in the gain control block of a repeater according to one embodiment of the present invention.

FIG. 5 is a block diagram of a gain metric generator which can be incorporated in the gain control block of a repeater according to one embodiment of the present invention. Referring to FIG. 5, a gain metric generator 560 receives digital samples of the gain control input signal p[k] from the repeater circuitry of the repeater. The gain control input signal p[k] can be the non-echo-cancelled receive signal of the repeater or an echo-cancelled receive signal of the repeater, as shown in FIGS. 3 and 4, or the gain control input signal can be taken before or after the variable gain stage. Gain metric generator 560 first downsamples the gain control input signal p[k] by M in downsampler block 502. The downsampling rate M is a function of the sampling frequency of the gain control input signal and is selected to minimize the bias between the downsampled gain control metric and the actual gain control metric while keeping the delay in the gain metric computation small. In one embodiment, the downsampling rate M is 8 for a sampling frequency of 39 MHz. That is, downsampler block 502 passes every 8th sample of the gain control input signal when the sampling frequency is 39 MHz frequency. In another embodiment, the downsampling rate M is 6 for a sampling frequency of 30 MHz. In other embodiments, the downsampling rate M can be X where the downsampler block downsamples 1 in X for a given sampling rate. In yet another embodiment, the downsampling rate M is configurable.

The downsampled gain control input signal q[k] is then provided to the computational blocks to compute the correlation and normalization terms of the gain control metric. More specifically, the tap-specific gain control metric at time i and at a channel tap $\tau$ is given as follows:

$$g_i(\tau) = \left| \frac{\sum_{n=0}^{N-1} q^*[n+i]q[n+i+N_{delay}+\tau]}{\sum_{n=0}^{N-1} |q[n+i]|^2} \right|^2 = \left| \frac{R_i(\tau)}{S_i} \right|^2,$$

$$\tau = 0, 1, L, N_{tap}.$$

In the present embodiment, the tap-specific gain control metric $g_i(\tau)$ is characterized as a square of a correlation term $R_i$ in the numerator divided by a normalization term $S_i$ in the denominator, where $\tau$ is the channel tap in time domain associated with the spread of the feedback signal in time domain, such as due to multipath effect. In gain metric generator 560, a correlation term computation block 504 computes the correlation value $R(\tau)$ across all channel taps ($N_{tap}$ is the number of channel taps) and a normalization term computation block 506 computes the normalization term S.

In gain metric generator 560, the computed correlation and normalization results are downsampled once again by a downsampler block 508. In the present illustration, the correlation and normalization results are downsampled at a downsampling rate B. In one embodiment, downsampling rate B is 2048. B can be thought of as the integration length since because blocks 504 and 506 act as integrators. Downsampling rate B is not sensitive to frequency and is not a function of the sampling frequency because the first downsampling block 502 already removes the dependency of the computed values on the sampling frequency. In other embodiments, downsampling rate B can be configurable and can be selected from a value of 1024 to 4096. In operation, downsampler block 508 fills up a buffer having a size B with the correlation results and another buffer of size B with the normalization results. Downsampler block 508 generates the downsampled correlation value $R_d(\tau)$ and the downsampled normalization value $S_d$.

The downsampled correlation results $R_d(\tau)$ and normalization results $S_d$ are provided to a computation block 510 to compute the gain control metric $g_i$. In the present embodiment, the gain control metric $g_i$ is computed by summing the square of the downsampled correlation terms over all channel taps and dividing the sum by the square of the normalization term. In other embodiments, the gain control metric $g_i$ can be computed using other mathematical equivalent computation, such as computing a normalized correlation term by dividing the downsampled correlation term of each tap by the downsampled normalization term and then squaring the quotient. The normalized correlation terms across all channel taps are summed to generate the gain control metric $g_i$. In the present embodiment, the computed gain control metric $g_i$ is then filtered by a non-linear filter 512 to generate the final filtered gain control metric $g_f$. In the present embodiment, the non-linear filter 512 is a median filter. In other embodiments, filter 512 can be implemented as a linear filter.

As thus configured, gain metric generator 560 generates a final gain control metric $g_f$ that is optimized through downsampling and nonlinear filtering to improve the metric performance. The downsampling operations reduce the computational burden as well as eliminate bias in the metric calculation. The non-linear filtering is effective in removing metric computation noise. A gain control metric with improved performance is thus obtained.

In the present embodiment of gain metric generator 560, the downsampled gain control input signal is also coupled to a saturation metric computation block 507 to compute a saturation metric. The saturation metric is intended to be a fast metric to give an early warning of control loop instability in the repeater. In gain metric generator 560, the gain control metric $g_f$ requires multiple downsampling and computation steps and therefore responds more slowly to changes in the gain control input signal. In the present embodiment, gain metric generator 560 also computes a saturation metric which is a fast metric to provide an early indication of instability so that the gain control block of the repeater can respond before the control loop becomes unstable. In one embodiment, the saturation metric is computed as the sum of a given number of samples of the downsampled gain control input signal, given as:

$$Sat = \sum_{n=1}^{N_{Sat}} |q(n)|^2.$$

In one embodiment, the saturation metric computation block 507 sums 32 samples of the downsampled gain control input signal ($N_{Sat}=32$) to generate the saturation metric Sat. The saturation metric Sat is able to respond quickly when the gain control input signal p[k] becomes large and the gain control block of the repeater is able to maintain repeater stability. The use of the saturation metric in the gain control block of the present invention is optional and may be omitted in other embodiments of the present invention.

Figure 6:
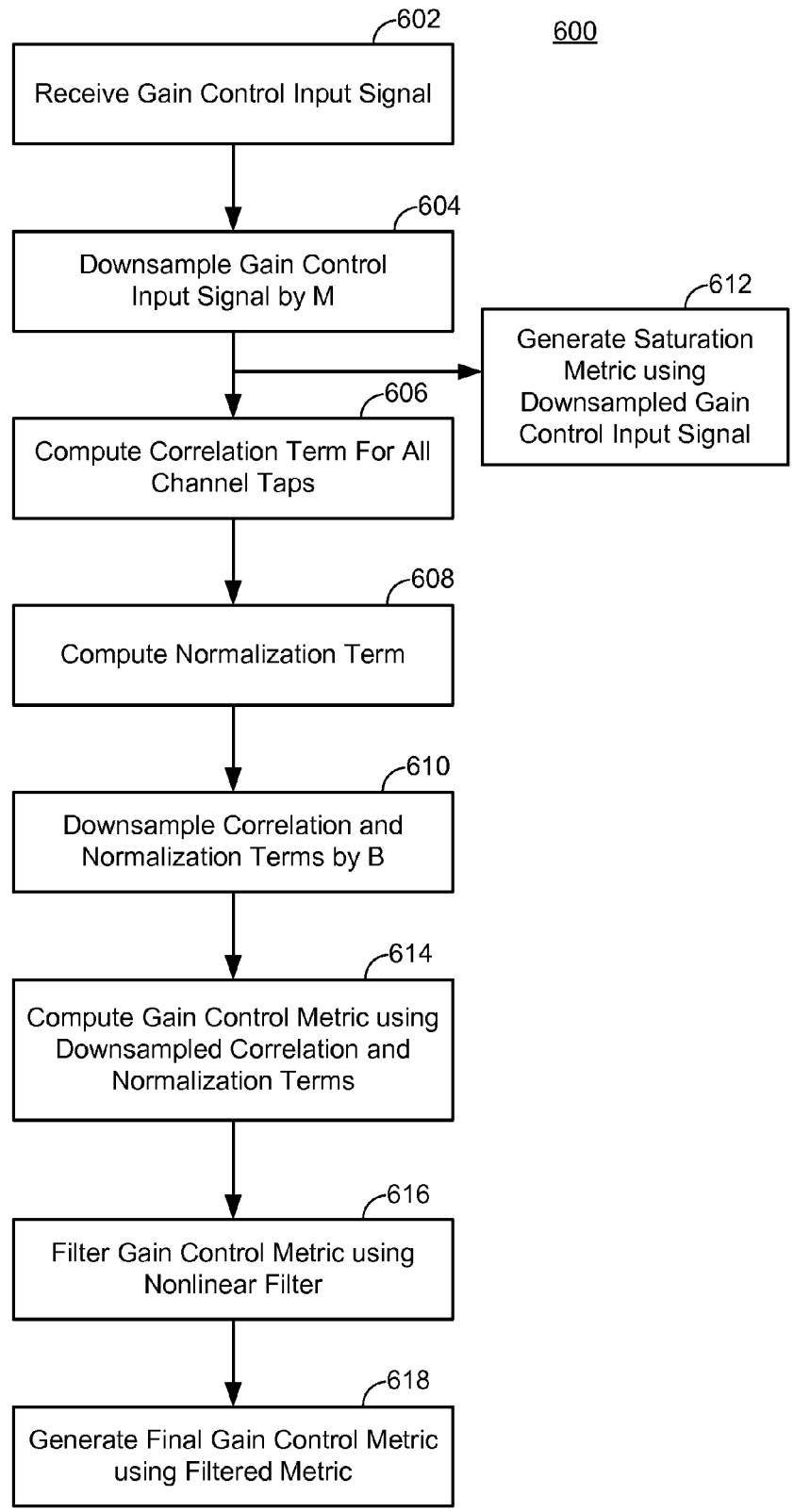
FIG. 6 is a flow chart illustrating a gain control metric computation method according to one embodiment of the present invention.

FIG. 6 is a flow chart illustrating a gain control metric computation method according to one embodiment of the present invention. Referring to FIG. 6, the gain control metric calculation method starts with receiving digital samples of the gain control input signal from the repeater circuitry of the repeater (step 602). The gain control input signal can be the receive signal of the repeater or an echo-cancelled receive signal of the repeater, as shown in FIGS. 3 and 4. The gain control input signal is downsampled by downsampling rate M (step 604). Then the correlation terms for all channel taps are computed (step 606) and the normalization term is computed (step 608). At this point, the downsampled gain control input signal can also be used to generate a saturation metric Sat (step 612).

The computed correlation and normalization terms are downsampled by downsampling rate B (step 610). In the present embodiment, the downsampled correlation and normalization results are then used to compute the gain control metric by squaring and summing the correlation results and taking the ratio with the square of the normalization result (step 614). In the present embodiment, the computed metric is then filtered using non-linear filter, such as a median filter (step 616). The final gain control metric g is thus generated using the filtered metric (step 618).

As described above, the calculation of the gain control metric $g_i$, is computationally intensive. For instance, a large number of multiplications, including complex multiplications, is required each time the correlation value or the normalization value needs to be updated. In one embodiment of the present invention, to ease the computational burden of computing the correlation and normalization terms, the gain control metric computation method described in commonly assigned, copending U.S. patent application 12/722,733, is employed. The gain control metric computation method realizes a particular advantage in that the complexity of the computation is independent of the integration length N, i.e., the complexity of the computation does not increase with the integration length.

First, in the computation of the correlation term $R_i$, at each time i, most of the multiplications are the same as the ones already computed in the previous time sample except for one. According to one embodiment of the present invention, a register is used to hold the correlation value $R(\tau)$ at each lag $\tau$ computed for a previous N samples. All the multiplication terms from the previous time samples are computed and summed and stored in the register. When a new time sample is introduced, the (N+1)th previous sample becomes the old or obsolete sample. The correlation value $R(\tau)$ is computed by discarding the multiplication term of the obsolete sample and adding the multiplication term of the new sample to the stored correlation value. As a result, only two multiplications are performed at each time sample—one for the new sample and one for the obsolete sample. The product based on the new sample is added to the stored sum and the product based on the obsolete sample is subtracted from the stored sum to generate the updated correlation value $R(\tau)$.

More specifically, the correlation value at each lag $\tau$ is given as:

$$R_i(\tau) = \sum_{n=0}^{N-1} q^*[n+i]q[n+i+N_{delay}+\tau], \quad t=0,1,L,N_{tap}.$$

The correlation value is updated once a new sample is received, as follows:

$$R_{i+1}(\tau) = \sum_{n=0}^{N-1} q^*[n+i+1]q[n+i+1+N_{delay}+\tau]$$
$$= R_i[\tau] + q^*[N+i]q[N+i+N_{delay}+\tau] - q^*[i]q[i+N_{delay}+\tau],$$

where $\tau = 1, 2, L, N_{tap}$.

Figure 7:
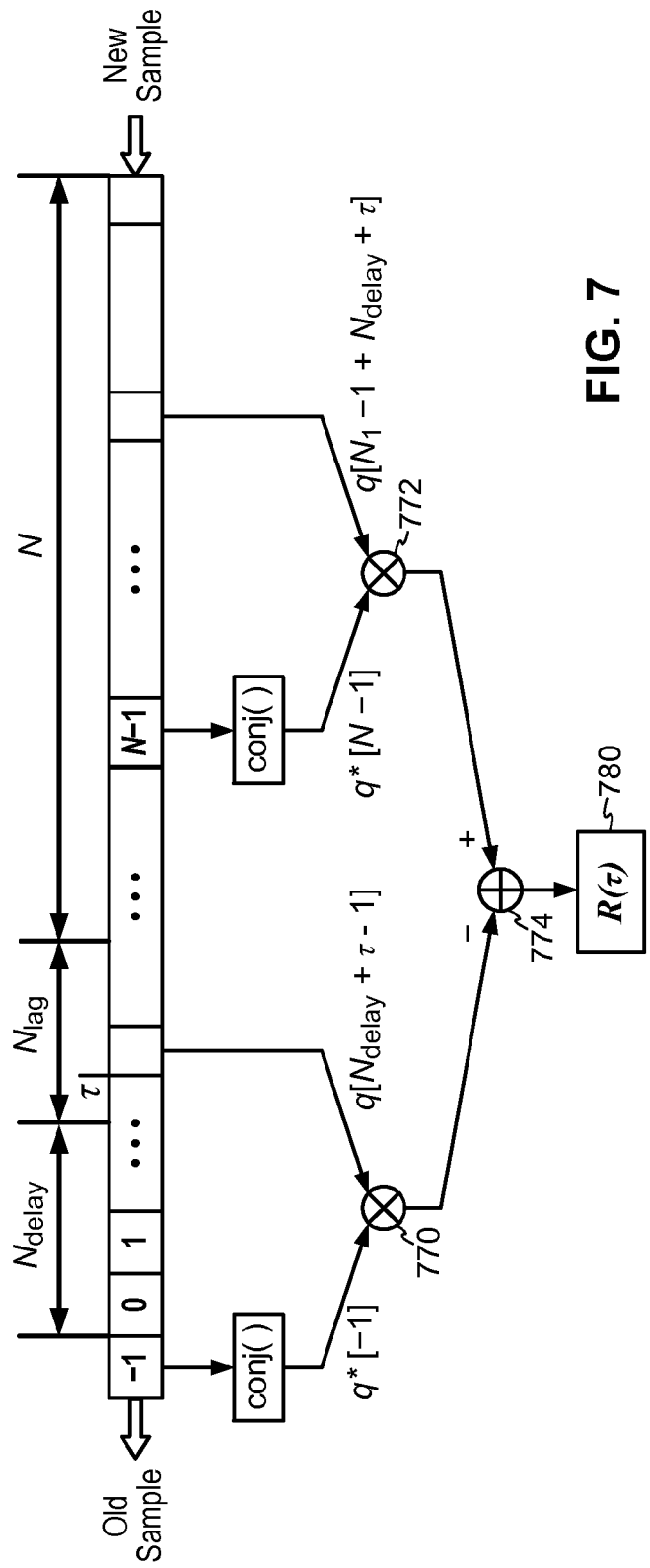
FIG. 7 illustrates the update operation for the correlation term $R(\tau)$ at lag $\tau$ on the gain control metric computation method according to one embodiment of the present invention.

As can be observed from the above equation, only two complex multiplications are required per lag per new sample instead of N multiplications required in the conventional computation. FIG. 7 illustrates the update operation for the correlation term $R(\tau)$ at lag $\tau$ on the gain control metric computation method according to one embodiment of the present invention. As shown in FIG. 7, a register 780, a complex register, is used to hold the correlation value $R(\tau)$ at each lag $\tau$ computed for a previous N samples. For each new sample, only two complex multiplications are performed per lag per new sample in order to obtain the updated correlation term $R(\tau)$. One complex multiplication (multiplier 770) is performed to compute the term for the obsolete sample and one complex multiplication (multiplier 772) is performed to compute the term for the new sample. The product based on the new sample is added to the stored sum and the product based on the obsolete sample is subtracted from the stored sum (summer 774) to generate the updated correlation value $R(\tau)$.

The normalization term (common to all lags) is updated in a similar fashion as the correlation value. More specifically, the normalization term $S_{i+1}$ is updated as follows:

$$S_{i+1} = \sum_{n=0}^{N-1} |q[n+i+1]|^2 = S_i + |q[N+i]|^2 - |q[i]|^2$$

Figure 8:
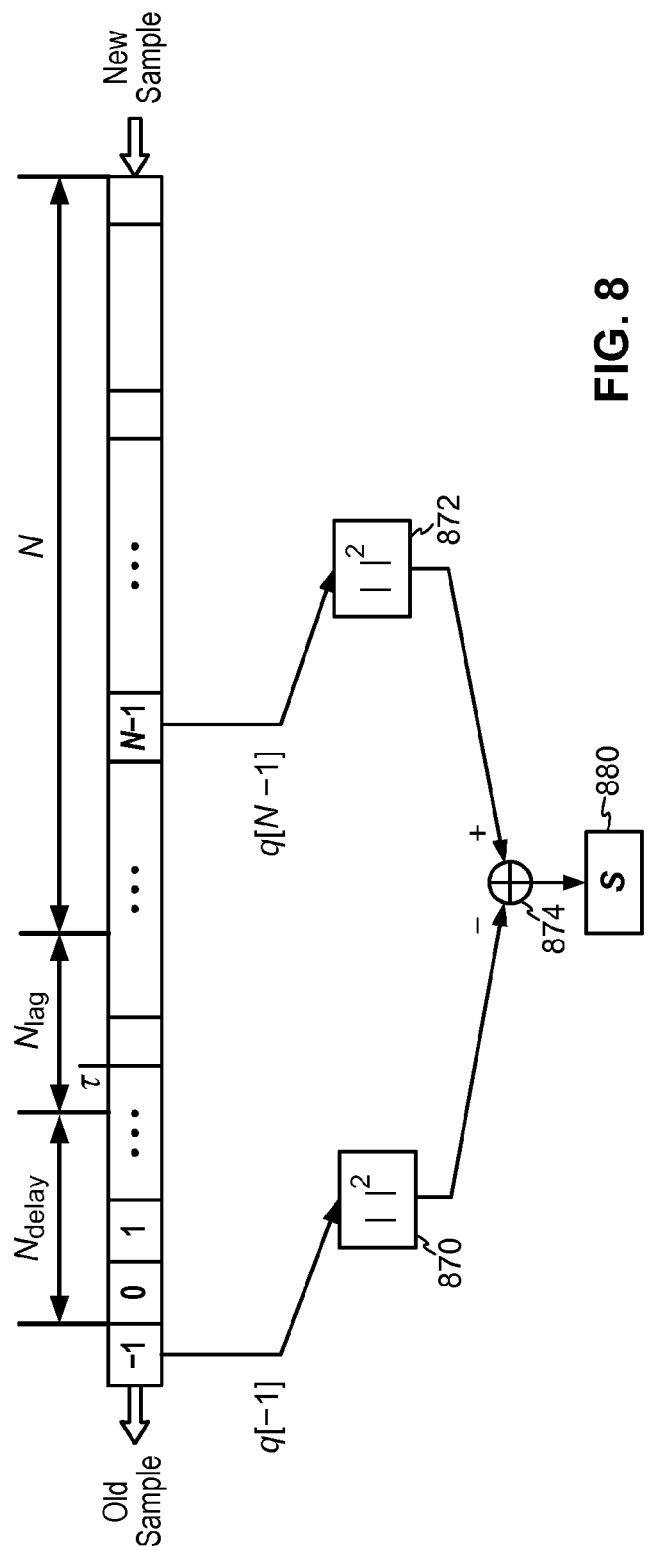
FIG. 8 illustrates the update operation for the normalization term S for all lags in the gain control metric computation method according to one embodiment of the present invention.

FIG. 8 illustrates the update operation for the normalization term S for all lags in the gain control metric computation method according to one embodiment of the present invention. As shown in FIG. 8, a register 880, a real register, is used to hold the normalization value S for all lags τ. All the multiplication terms from the previous time samples are computed and summed and stored in the register 880. When a new time sample is introduced, the normalization value S is computed by discarding the multiplication term of the obsolete sample which is the (N+1)th previous sample (multiplier 870) and adding the multiplication term of the new sample (multiplier 872) to the stored normalization value in register 880. As a result, only two multiplications are performed at each time sample—one for the new sample and one for the obsolete sample. The product based on the new sample is added to the stored sum and the product based on the obsolete sample is subtracted from the stored sum at summer 874 to generate the updated normalization value S.

The registers for storing values of R and S are updated at sample rate. However, the calculation of gain control metric $g_i[\tau]=(R[\tau]/S)^2$, $\tau=0, 1, L, N_{tap}-1$, and the corresponding gain adjustment are usually performed in a much slower pace than the sample rate.

In the above described embodiments, a tap-specific gain control metric $g_i(\tau)$ characterized as a square of a correlation term $R_i$ in the numerator divided by a normalization term $S_i$ in the denominator is used. In other embodiments of the present invention, the gain control metric computation method can be applied to other gain control metrics. In general, a gain control metric is computed based on a correlation value and is computed by combining the correlation values over all channel taps using a linear or non-linear function. In the present embodiment, the gain control metric is computed as a linear combination of the squared correlation values of each channel tap. In other embodiments, the gain control metric is computed using a given function of the correlation value from each channel tap. For example, a non-linear combination of the correlation terms may be used to generate the gain control metric. The exact formulation of the gain control metric is not critical to the practice of the present invention and the gain control metric computation method of the present invention can be applied to gain control metrics in any forms.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station or a repeater, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Also, computer instructions/code may be transmitted via signals over physical transmission media from a transmitter to a receiver. For example, if the software is transmitted from a website, server, or other remote source using a coaxial cable, fiber optic cable, twisted pair, digital subscriber line (DSL), or physical components of wireless technologies such as infrared, radio, and microwave. Combinations of the above should also be included within the scope of physical transmission media.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A method for computing a gain control metric for a wireless repeater in a wireless communication system, the wireless repeater having a first antenna and a second antenna to receive a receive signal and transmit an amplified signal, the receive signal being a sum of a remote signal to be repeated and a feedback signal resulting from a feedback channel between the first and second antenna of the wireless repeater, the feedback channel thus forming a feedback loop between the first and second antennas, the method comprising:

receiving a gain control input signal from a repeater circuitry of the repeater, the gain control input signal being taken from any point in the feedback loop of the repeater;

downsampling the gain control input signal at a first downsampling rate;

computing a correlation term for each of desired channel taps, the correlation term being indicative of a correlation of the gain control input signal and a delayed version of the gain control input signal;

computing a normalization term, the normalization term being indicative of a power of the gain control input signal that is not delayed;

downsampling the computed correlation terms and the normalization term at a second downsampling rate;

computing a pre-filtered gain control metric using a given function of at least the downsampled correlation terms; and filtering the pre-filtered gain control metric to generate the gain control metric.

2. The method of claim 1, wherein computing a pre-filtered gain control metric using a given function of the downsampled correlation terms comprises:

computing a pre-filtered gain control metric being a sum of the square of the downsampled correlation terms across all desired channel taps divided by the square of the downsampled normalization term.

3. The method of claim 2, wherein computing a pre-filtered gain control metric being a sum of the square of the downsampled correlation terms across all desired channel taps divided by the square of the downsampled normalization term comprises:

providing a first register for storing a stored correlation value, the stored correlation value being the correlation term computed over a previous N samples;

providing a second register for storing a stored normalization value, the stored normalization value being the normalization term computed over a previous N samples;

receiving a new sample of the gain control input signal;

computing an updated correlation value by performing a first multiplication using an obsolete sample of the gain control input signal, the obsolete sample being the (N+1)th previous sample, and a second multiplication using the new sample of the gain control input signal, the updated correlation value being computed by adding the product from the second multiplication and subtracting the product from the first multiplication;

computing an updated normalization value by performing a third multiplication using an obsolete sample of the gain control input signal, the obsolete sample being the (N+1)th previous sample, and a fourth multiplication using the new sample of the gain control input signal, the updated normalization value being computed by adding the product from the fourth multiplication and subtracting the product from the third multiplication; and computing the pre-filtered gain control metric using the updated correlation value and the updated normalization value.

4. The method of claim 2, wherein the pre-filtered gain control metric at a given channel tap $\tau$ is $g[\tau]=(R(\tau)/S)^2$, where $R(\tau)$ is the correlation term and S is the normalization term.

5. The method of claim 1, wherein filtering the pre-filtered gain control metric comprises filtering the pre-filtered gain control metric using a non-linear filter to generate the gain control metric.

6. The method of claim 5, wherein filtering the pre-filtered gain control metric using a non-linear filter to generate the gain control metric comprises filtering the pre-filtered gain control metric using a median filter to generate the gain control metric.

7. The method of claim 1, wherein filtering the pre-filtered gain control metric comprises filtering the pre-filtered gain control metric using a linear filter to generate the gain control metric.

8. The method of claim 1, wherein the first downsampling rate is 8 for a sampling frequency of 39 MHz.

9. The method of claim 1, wherein the second downsampling rate is selected from the range of 1024 to 4096.

10. The method of claim 1, wherein receiving a gain control input signal from a repeater circuitry of the repeater comprises receiving an echo cancelled signal from the repeater circuitry.

11. The method of claim 1, wherein receiving a gain control input signal from a repeater circuitry of the repeater comprises receiving a signal from the repeater circuitry without echo cancellation.

12. The method of claim 1, wherein computing a pre-filtered gain control metric using a given function of at least the downsampled correlation terms comprises:

computing a pre-filtered gain control metric using a linear combination of the square of the downsampled correlation terms across the desired channel taps.

13. The method of claim 1, wherein computing a pre-filtered gain control metric using a given function of at least the downsampled correlation terms comprises:

computing a pre-filtered gain control metric using a non-linear combination of the downsampled correlation terms across the desired channel taps.

14. A wireless repeater having a first antenna and a second antenna to receive a receive signal and transmit an amplified signal, the receive signal being a sum of a remote signal to be repeated and a feedback signal resulting from a feedback channel between the first antenna and the second antenna, the feedback channel thus forming a feedback loop between the first and second antennas, the repeater comprising:

a repeater circuitry configured to receive the receive signal from one of the first antenna and the second antenna and provide a gain control input signal, the gain control input signal being taken from any point in the feedback loop of the repeater; and a gain metric generator coupled to receive the gain control input signal from the repeater circuitry of the repeater, the gain metric generator configured to downsample the gain control input signal at a first downsampling rate, to compute a correlation term for each of desired channel taps where the correlation term is indicative of a correlation of the gain control input signal and a delayed version of the gain control input signal, to compute a normalization term where the normalization term is indicative of a power of the gain control input signal that is not delayed, to downsample the computed correlation terms and the normalization term at a second downsampling rate, to compute a pre-filtered gain control metric using a given function of at least the downsampled correlation terms, and to filter the pre-filtered gain control metric to generate the gain control metric.

15. The wireless repeater of claim 14, wherein the gain metric generator is configured to compute a pre-filtered gain control metric being a sum of the square of the downsampled correlation terms across all desired channel taps divided by the square of the downsampled normalization term.

16. The wireless repeater of claim 15, wherein the gain metric generator further comprises:

a first register to store a stored correlation value, the stored correlation value being the correlation term computed over a previous N samples;

a second register to store a stored normalization value, the stored normalization value being the normalization term computed over a previous N samples, wherein the gain metric generator receives a new sample of the gain control input signal; the gain metric generator computes an updated correlation value by performing a first multiplication using an obsolete sample of the input signal, the obsolete sample being the (N+1)th previous sample, and a second multiplication using the new sample of the gain control input signal, the updated correlation value being computed by adding the product from the second multiplication and subtracting the product from the first multiplication; and wherein the gain metric generator computes an updated normalization value by performing a third multiplication using an obsolete sample of the gain control input signal, the obsolete sample being the (N+1)th previous sample, and a fourth multiplication using the new sample of the gain control input signal, the updated normalization value being computed by adding the product from the fourth multiplication and subtracting the product from the third multiplication, the gain metric generator computing the gain control metric using the updated correlation value and the updated normalization value.

17. The wireless repeater of claim 15, wherein the pre-filtered gain control metric at a given channel tap $\tau$ is $g[\tau] = (R(\tau)/S)^2$, where $R(\tau)$ is the correlation term and S is the normalization term.

18. The wireless repeater of claim 14, wherein the gain metric generator filters the pre-filtered gain control metric using a non-linear filter to generate the gain control metric.

19. The wireless repeater of claim 18, wherein the gain metric generator filters the pre-filtered gain control metric using a median filter to generate the gain control metric.

20. The wireless repeater of claim 14, wherein the gain metric generator filters the pre-filtered gain control metric using a linear filter to generate the gain control metric.

21. The wireless repeater of claim 14, wherein the gain metric generator is configured to compute a pre-filtered gain control metric using a linear combination of the square of the downsampled correlation terms across the desired channel taps.

22. The wireless repeater of claim 14, wherein the gain metric generator is configured to compute a pre-filtered gain control metric using a non-linear combination of the downsampled correlation terms across the desired channel taps.

23. The wireless repeater of claim 14, wherein a repeater circuitry is configured to provide a gain control input signal being an echo cancelled signal.

24. The wireless repeater of claim 14, wherein a repeater circuitry is configured to provide a gain control input signal being a signal from the repeater circuitry without echo cancellation.

25. A wireless repeater having a first antenna and a second antenna to receive a receive signal and transmit an amplified signal, the receive signal being a sum of a remote signal to be repeated and a feedback signal resulting from a feedback channel between the first antenna and the second antenna, the feedback channel thus forming a feedback loop between the first and second antennas, the repeater comprising:

means for receiving the receive signal from one of the first antenna and the second antenna and providing a gain control input signal, the gain control input signal being taken from any point in the feedback loop of the repeater; and means for receiving the gain control input signal from the repeater circuitry of the repeater, the means further for downsampling the gain control input signal at a first downsampling rate, computing a correlation term for each of desired channel taps where the correlation term is indicative of a correlation of the gain control input signal and a delayed version of the gain control input signal, computing a normalization term, the normalization term being indicative of a power of the gain control input signal that is not delayed, downsampling the computed correlation terms and the normalization term at a second downsampling rate, computing a pre-filtered gain control metric using a given function of at least the downsampled correlation terms, and filtering the pre-filtered gain control metric to generate the gain control metric.

* * * * *